United States Patent [19]

Cleland et al.

[11] 4,295,048

[45] Oct. 13, 1981

[54] METHOD AND SYSTEM FOR SCANNING A BEAM OF CHARGED PARTICLES TO CONTROL IRRADIATION DOSAGE

[76] Inventors: Marshall R. Cleland, 9 Mohegan Pl., Huntington Station, N.Y. 11746; Howard F. Malone, Sr., 35 Third Ave., Massapequa Park, N.Y. 11762

[21] Appl. No.: 145,061

[22] Filed: Apr. 28, 1980

[51] Int. Cl.[3] ........................ G01K 1/08; G01N 23/00

[52] U.S. Cl. .................................. 250/398; 250/492.2

[58] Field of Search ........... 250/492 B, 492 A, 356 R, 250/398, 306, 311; 219/121 EB, 121 EM; 313/361

[56] References Cited

U.S. PATENT DOCUMENTS

| | | | |
|---|---|---|---|
| 2,680,815 | 6/1954 | Burrill | 250/492 B |
| 2,741,704 | 4/1956 | Trump et al. | 250/492 B |
| 3,109,931 | 11/1963 | Knowlton et al. | 250/492 B |
| 3,687,716 | 8/1972 | Steigerwald | 250/492 B |
| 4,021,675 | 5/1977 | Shifrim et al. | 250/492 A |

*Primary Examiner*—Bruce C. Anderson
*Attorney, Agent, or Firm*—Howard L. Rose

[57] ABSTRACT

A method and system for scanning a beam of charged particles to control radiation dose distributions is implemented by deflecting the beam through a plurality of positions across a conveyor path along which an object to be irradiated is moved, and controlling the length of time the beam remains at each position in accordance with the radiation dose required at each position. The beam may be deflected by a single magnet beam scanning device supplied with a drive signal having a step-like waveform or by a series of sequentially operated, controllable deflection magnets arranged along a beam pipe to sequentially deflect the beam toward the object to be irradiated from different positions.

29 Claims, 12 Drawing Figures

METHOD AND SYSTEM FOR SCANNING A BEAM OF CHARGED PARTICLES TO CONTROL IRRADIATION DOSAGE

BACKGROUND OF THE INVENTION

1. Field of the Invention

The present invention pertains to methods and systems for scanning a beam of charged particles, such as an electron beam, across a conveyor path and, more particularly, to such methods and systems wherein the beam is moved incrementally across the conveyor path and the radiation dose at each incremental position is controlled only by movement of the beam.

2. Discussion of the Prior Art

Objects moving along a conveyor path are conventionally irradiated with beams of charged particles to produce desirable effects, such as altering characteristics by cross-linking, sterilizing, and facilitating curing among others. In order to irradiate all surfaces of objects moving along a conveyor path, the beam of charged particles is normally scanned across the conveyor path by means of an electrically energized scanning magnet for sweeping the beam in a scanning horn or, in some cases, by means of moving magnets or selectively controlled magnets. U.S. Pat. No. 2,887,583 to Emanuelson, U.S. Pat. No. 2,897,365 to Dewey II et al, U.S. Pat. No. 3,246,147 to Skala, U.S. Pat. No. 3,193,717 to Nunam, U.S. Pat. No. 3,687,716 to Steigerwald and U.S. Pat. No. 3,442,017 to Uehara et al are examplary of such prior art scanning systems.

In many applications, the radiation dose required at different locations on the objects varies in accordance with the configuration of the object or a specific pattern of irradiation required. Accordingly, it has been the practice in the prior art to vary the intensity of the beam, that is, vary beam voltage or current, during scanning, such as by means of a beam control device as described in the Steigerwald U.S. Pat. No. 3,687,716, in order to vary the irradiation dosage to which portions of an object to be irradiated are subjected. Although such systems are completely acceptable in some applications, they do not lend themselves to systems in which dose rate must be maintained at a precise level or below a specific level and/or systems in which the beam must impinge upon precise discrete and often discontinuous regions of the object.

The present invention has a further object in that a scanning system for a beam of charged particles controls the beam to move it incrementally across a conveyor path while maintaining the beam at each incremental position for preselected times to control irradiation dosage.

An additional object of the present invention is to utilize a plurality of sequentially energized controllable deflection magnets to scan, spread, distribute, disperse or deflect a small diameter, essentially parallel beam of charged particles across a conveyor path along which objects or material to be irradiated are moved in order to produce a uniform or controlled non-uniform irradiation dosage to a continuous or interrupted path across the full width of the conveyor.

The present invention has another object in that the energization time of each of a plurality of controllable deflection magnets can be varied between zero and prescribed discrete time intervals to control the irradiation pattern and dose on an object to be irradiated with smooth gradations in dose distribution obtained by increasing or decreasing the pulse widths of successive pulses supplied to the deflection magnets.

Yet a further object of the present invention is to control the scanning of a beam of charged particles across a conveyor path to produce selective irradiation pattern and/or dosage by deflecting the beam through a plurality of selected positions across the conveyor path and maintaining the beam at each of the selected positions for a preselected time in accordance with the irradiation dosage required at each of the selected positions.

The present invention has as an additional object, the control of the irradiation dosage at various positions across a conveyor path by deflecting the beam incrementally from position to position and controlling the length of time the beam remains at each position, whereby does variation is obtained with the use of a constant beam current load on the accelerator thus stabilizing the high voltage potential, i.e. beam energy.

Additional objects of the present invention over the prior art are to provide a method and system having increased versatility and more adaptability to a variety of irradiation processes than conventional beam scanning methods and systems, utilizing in one embodiment a plurality of sequentially operated controllable deflection magnets to decrease the expense of fabrication due to a reduction in the area and weight of the evacuated chamber used for scanning, to reduce the outgasing rate and the vacuum pumping requirements and to permit utilization of a horizontal mounting of a beam accelerator alongside a conveyor of material or objects to be irradiated thereby reducing ceiling height requirements and facility costs for high energy accelerators (above 0.5 MeV).

The present invention is generally characterized in a system for controlling the scanning of a beam of charged particles across a conveyor path to produce selective dose distributions including a particle accelerator for producing a beam of charged particles, a deflection magnet or a plurality of deflection magnets controllably operated to deflect the beam through a plurality of positions across the conveyor path, and control means coupled with the deflection magnet to sweep the beam through a plurality of positions across the conveyor path while maintaining the beam at each of the positions for a preselected time in accordance with the irradiation dosage required at each of the positions.

The present invention is further generally characterized in a method of scanning a beam of charged particles across a conveyor path to control the radiation dose at a plurality of positions along the line of scan including the steps of deflecting the beam incrementally from position to position along the line of scan, and controlling the length of time the beam remains at each position to control the radiation dose at each position.

Other objects and advantages of the present invention will become more apparent from the following description of the preferred embodiments taken in conjunction with the accompanying drawings.

DESCRIPTION OF THE PREFERRED EMBODIMENTS

Figure 1:
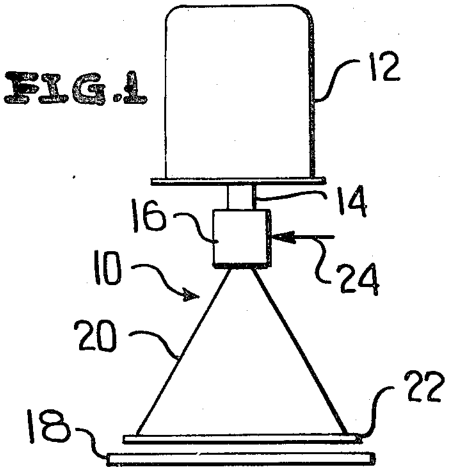
FIG. 1 is a diagrammatic view of a beam scanning system according to the present invention.

A beam scanning system 10 according to the present invention is shown in FIG. 1 and includes a particle accelerator 12, such as an electron beam accelerator as described in U.S. Pat. No. 2,875,394 to Cleland, supplying a beam of charged particles via a vacuum pipe 14 to a conventional single magnet, beam scanning device 16 which is adapted to deflect the beam across a conveyor path along which an object to be irradiated 18 is moved. A scanning horn 20 extends from beam scanning device 16 and carries a beam window 22 at its lower end disposed immediately above the conveyor path. While the present invention will be described hereinafter as used with electron beams, it is understood that the beam scanning system and method of the present invention can be used with any suitable beam of charged particles.

Figure 3:
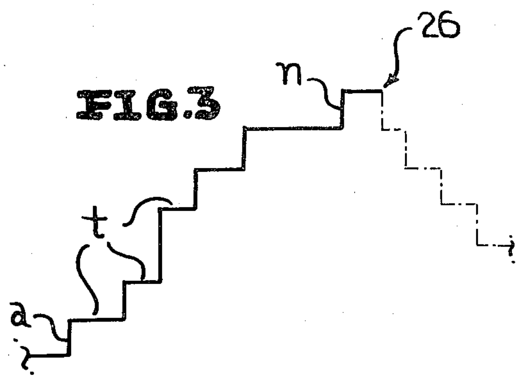
FIG. 3 is a waveform generated by the circuit of FIG. 2 to drive the beam scanning device of FIG. 1.
Figure 2:
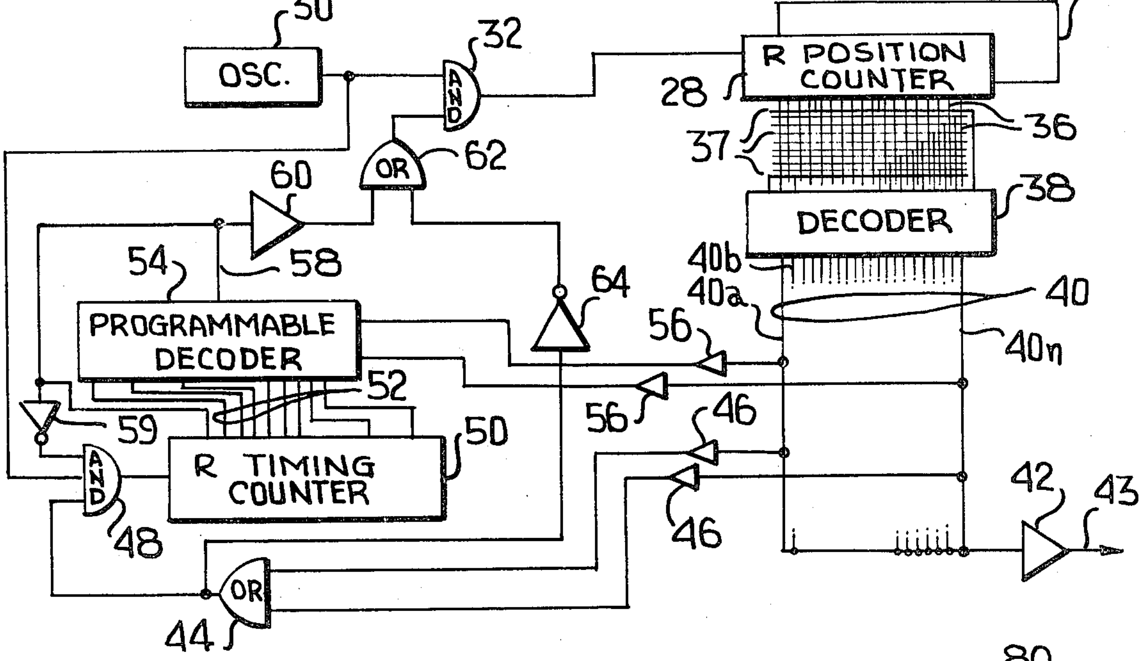
FIG. 2 is a schematic diagram of a circuit for controlling the scanning of the beam in FIG. 1.

The beam scanning device 16 has an input 24 receiving an electrical drive signal controlling the beam scanning device to cause the beam to be moved or scanned substantially transversely across the conveyor path. In prior art scanning systems, the drive signal normally has a triangular waveform to produce a continuously moving scan; however, in accordance with the present invention, the drive signal is a step or staircase waveform 26, as shown in FIG. 3, to produce an incrementally moving scan. To generate waveform 26, the circuit of FIG. 2 is utilized, the circuit including a position counter 28 receiving clock pulses from an oscillator 30 under the control of an AND gate 32. The position counter 28 has an output 34 for resetting the counter once the counter is full and outputs 36 selectively connectable to inputs 37 of a decoder 38 containing logic circuitry to produce on each of a plurality of outputs a signal of an amplitude determined by the input lead 37 that has been energized. The number of output leads 40 from the decoder 38 corresponds to the maximum number of incremental positions across the conveyor path at which it may be desired to position the beam and the maximum number of incremental positions is dependent upon the cross sectional configuration and dimensions of the electron beam and the transverse dimensions of the conveyor path such that each point along the scanning path may be irradiated as the electrom beam is scanned across the conveyor path. The signals on outputs 40 are supplied to an amplifier 42 to form on its output lead 43 a staircase or step-like waveform, as shown in FIG. 3, for supply to input 24 of beam scanning device 16.

The leads 36 and 37 form a matrix which may be interconnected to provide the desired height of each step of the wave. A completely regular step is achieved if the successive counter input leads 36 are connected to successive decoder input leads 37. However, if it is desired to skip a space on the object to be irradiated; i.e. to step the beam a double space in one increment of time, then the appropriate output lead 36 would be shifted to the next higher order input lead 37. For instance output lead 36 from the count five position would be connected to the input lead 37 corresponding to the count 6 position. Thus, the signal on lead 40 corresponding to a count of six would be produced. A shift of one position between output 36 and input 37 produces a double step such as indicated by 45 in FIG. 3 while a double shift produces a triple step, etc.

The programming of the stair step amplitude is determined by the cross connections in the matrix of leads 36–37. The cross connections may be accomplished by mechanical switches, AND gates or other electronic means.

Timing functions are accomplished by the circuitry interconnecting leads 40 and programmable decoder 54 and timing counter 50. Each of the outputs 40 is connected with a single OR gate 44 via a limiting buffer amplifier 46, so that all signals to the OR gate 44 are of equal amplitude. The output lead of the OR gate 44 is supplied as one input to an AND gate 48 which receives a second input from oscillator 30. AND gate 48 has an output supplying pulses to the timing counter 50 having outputs 52 connected with the programmable decoder 54 which also receives inputs from the outputs 40 of decoder 38 via buffer amplifiers 56. Programmable decoder 54 has an output 58 supplied through an inverter 59 as a third input to AND gate 48, to a reset input of timing counter 50 and, via a buffer amplifier 60, as one input of an OR gate 62, a second input of the OR gate 62 being received from OR gate 44 via an inverter 64. The output of OR gate 62 is supplied as a second input to AND gate 32.

In operation the objects 18 to be irradiated are moved along the conveyor path at a known speed and with the configuration and size of the electron beam known from the operating characteristics of the accelerator 12 and the width of the conveyor also known, the scanning frequency of the accelerator 12 and the dose required to irradiate all surfaces of the objects to proper dose can be determined. While the present invention is described herein with respect to the irradiation of objects, it will be appreciated that the present invention can be utilized to irradiate material of a continuous nature, such as hoses, cables, webs of material and the like, as well as a series of individual objects. Accordingly, the term "objects" as used herein is meant to encompass all products and materials adapted to be conveyed along a path for irradiation.

The scanning system 10 is adjusted for any variations in irradiation dosage to be received at any portion of the objects by correlating the position of the portions of the object with the positional outputs 40 from decoder 38. The decoder 54 is programmed accordingly to produce an output at 58 in accordance with the period of time the electron beam is to remain at each incremental position along the scanning path.

More specifically, when the beam scanning system 10 is initially placed in operation, AND gate 32 is enabled by the output of OR gate 44 via inverter 64 and OR gate 62 to pass clock pulses from oscillator 30 to position counter 28 until the count in the counter reaches a number such that decoder 38 produces a signal on output 40*a*, which signal is supplied to beam scanning device 16 via amplifier 42 to generate a first step leading edge "a" of the waveform 26. The output 40*a* is also received by OR gate 44 to inhibit AND gate 32 and prevent further clock pulses from being received by position counter 28 such that beam scanning device 16 will hold the electron beam at the incremental position corresponding to output 40*a*. AND gate 48 is enabled at this time by the output from OR gate 44 to pass clock pulses to timing counter 50 which counts the clock pulses until decoder 54 produces a signal at output 58 to reset the timing counter, input R, and inhibit AND gate 48 via inverter 59 such that clock pulses are no longer supplied to the timing counter. The signal on output 58 also enables AND gate 32 via OR gate 62 to again supply clock pulses to position counter 28. The output 58 from decoder 54 is produced after a predetermined time dependent upon which output 40 of decoder 38 is energized. That is, programmable decoder 54 contains circuitry responsive to energization of each of the decoder outputs 40 to produce an output when the timing counter 50 reaches a predetermined count corresponding to the time the electron beam is to be maintained at each position. The decoder 54 is programmed to produce a desired dose distribution for each object or run of objects to be irradiated.

Once the AND gate 32 again passes clock pulses to position counter 28, the counter counts the pulses until the next selected position decoder output 40*b* is energized at which time AND gate 32 is inhibited and AND gate 48 is enabled to initiate the timing cycle in the same manner as described above. In this manner, the drive signal supplied to the beam scanning device 16 is provided with a staircase or step-like waveform such that the electron beam is incrementally scanned transversely across the conveyor path in step-like fashion to irradiate the objects 18, the length of time that the electron beam remains in each position being controlled by the width "W" of each step of the waveform 26 in accordance with operation of the programmable decoder and the timing counter and each position being selected by the matrix of leads 36 and 37. Accordingly, the irradiation dosage at each incremental point or position along the scanning path is controlled without varying the intensity of the electron beam.

After the last incremental position along the scan line has been irradiated by controlling the length of time output 40*n* remains energized, position counter 28 is reset and a new scan line is produced in the same manner as discussed above. The drive signal for adjacent scan lines can vary simply by increasing the memory capability of programmable decoder 54 such that within the capability of the memory a specific pattern for each scan line is produced before the pattern repeats itself. The circuit of FIG. 2 can be expanded to produce a generally triangular incremental drive signal, as shown in dashed lines in FIG. 3, if desired; i.e. the counter 28 can be a reversible counter with the output on lead 34 initiating reversal.

Figure 4:
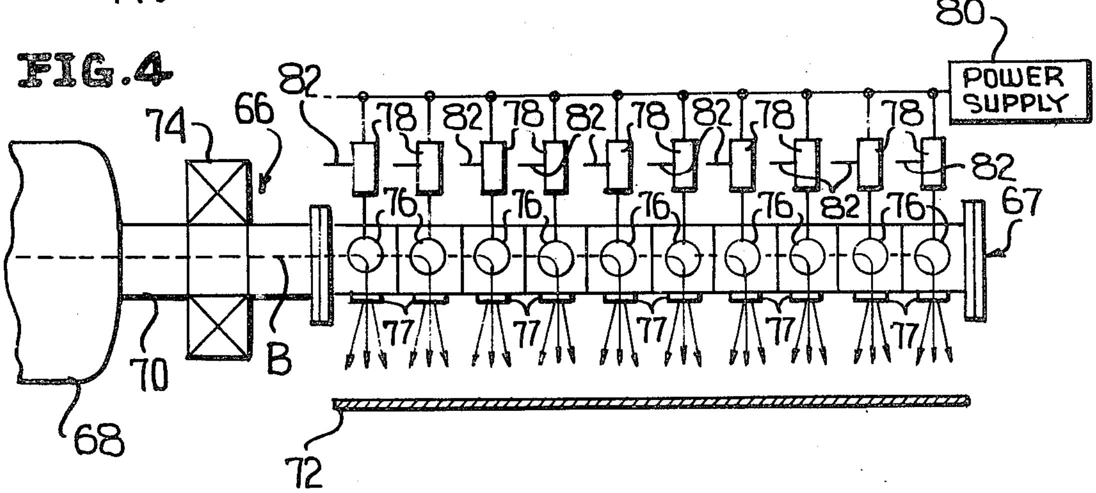
FIG. 4 is a diagrammatic elevation of another embodiment of a beam scanning system according to the present invention.

Another embodiment of a scanning control system 66 according to the present invention is shown in FIG. 4 and differs from scanning control system 10 primarily in that, instead of deflecting the electron beam by means of a single magnet beam scanning device, the electron beam is scanned across the conveyor path by a magnetic scanning assembly 67 composed of a plurality of controllable deflection magnets. To this end, an electron beam accelerator 68 is arranged on a horizontal axis, and a beam pipe 70 extends from the accelerator over and essentially parallel to the conveyor path along which objects 72 to be irradiated are moved. A vacuum pump 74, and a plurality of controllable deflection magnets 76 are positioned along the beam pipe to deflect an electron beam B from the accelerator to a plurality of positions along a scan line across the conveyor path. A plurality of beam exit windows 77 are disposed in the beam pipe 70, each positioned beneath one of the deflection magnets 76 and located along a side of the beam pipe facing the conveyor path. The controllable deflection magnets 76 are each controlled by one of a plurality of switching devices 78 connected between the deflection magnets and a power supply 80 for supplying electricity to energize the deflection magnets. The operation of each of the switching devices 78 is controlled at an input 82 by a pulse on an output 40 from a decoder 38′ of the circuit of FIG. 2. The only difference between decoder 38 and 38′ (not illustrated) is that the latter decoder provides the same signal level on all leads 40. Thus, the circuit of FIG. 2 can be used to control electron beam scanning by the beam scanning system 66 by merely disconnecting the amplifier 42 and connecting each of the outputs 40 to a corresponding input 82 of one of the switching devices 78. In this manner, the switching devices 78 will be sequentially operated with the time of operation controlled by the width of the pulse signals on outputs 40 via the programmable decoder 54 and the timing counter 50 and the beam position controller by matrix 36–37.

Accordingly, in operation, the selected deflection magnets 76 are sequentially energized to deflect the electron beam B to a first position for a predetermined period, a second position for a predetermined period of time and so on until the scan line is completed. In the same manner as described above, the pattern of irradiation for each scan line can be programmed to control the dose distribution as desired, such that the beam scanning system 66 can scan, spread, distribute, disperse or deflect a small-diameter, essentially parallel beam of electrons, etc. over a wide conveyor or moving material or objects to be irradiated to produce a uniform or controlled non-uniform radiation distribution across the entire width or a predetermined region of the width of the conveyor path. The deflection magnets and electron windows should be sufficiently large in number and positioned close enough together to produce a uniform irradiation dosage, if desired; and, to this end, separations of from several inches up to as much as a foot can be acceptable depending on the amount of dispersion and diffusion of the electron beams between the windows and the objects to be irradiated.

Figure 5:
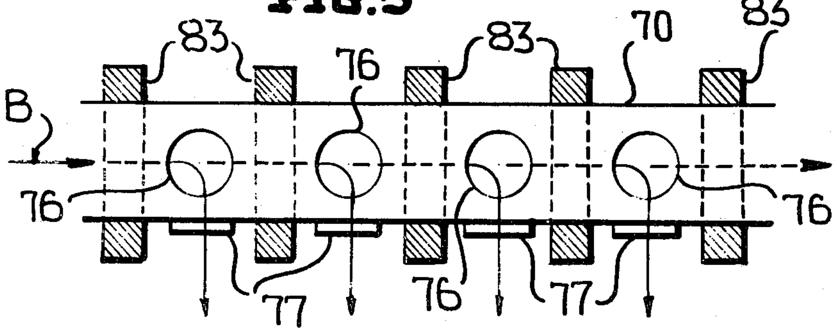
FIGS. 5 and 6 are diagrammatic elevations of additional modifications of the beam scanning system of FIG. 4.

When the beam scanning system of FIG. 4 is used with low voltage, high current electron beams, the natural divergence of the beam can cause inconsistencies in beam distribution; however, this problem can be minimized by using the magnetic scanning assembly modification illustrated in FIG. 5 wherein focus coils 83 are positioned between the electron windows 77 to create axial magnetic fields and convert the diverging electron beam into a spiralling beam of constant diameter, referred to as Brillouin flow. (See "Theory and Design of Electron Beams" by J. R. Pierce, Second Edition, D. Van Nostrand Co., Inc., New York, 1954, pages 152–168). The beam pipe 70, the deflection magnets 76 and the electron windows 77 of FIG. 5 otherwise have the same structure as described with reference to FIG. 4.

Figure 6:
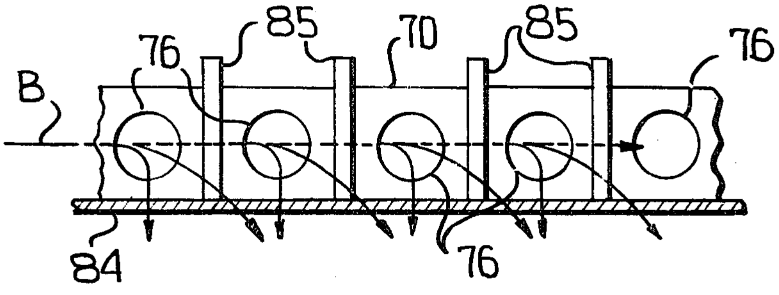

Another modification of the magnetic scanning assembly is shown in FIG. 6 wherein the magnetic scanning assembly includes an elongated beam window 84 extending the length of the beam pipe 70 thereby avoiding the loss of electrons during the transition from one deflection magnet to the next which could occur in the embodiments of FIGS. 4 and 5. A plurality of reinforcing ribs 85 are mounted on the beam pipe between the deflection magnets to prevent collapse of the beam pipe under vacuum. The use of a single elongated electron window also relaxes the requirement of very short rise and transition time circuits for use in the circuitry of FIG. 2 since the beam B can emerge from the magnetic scanning assembly between the magnets at deflections less than 90°.

Figure 7:
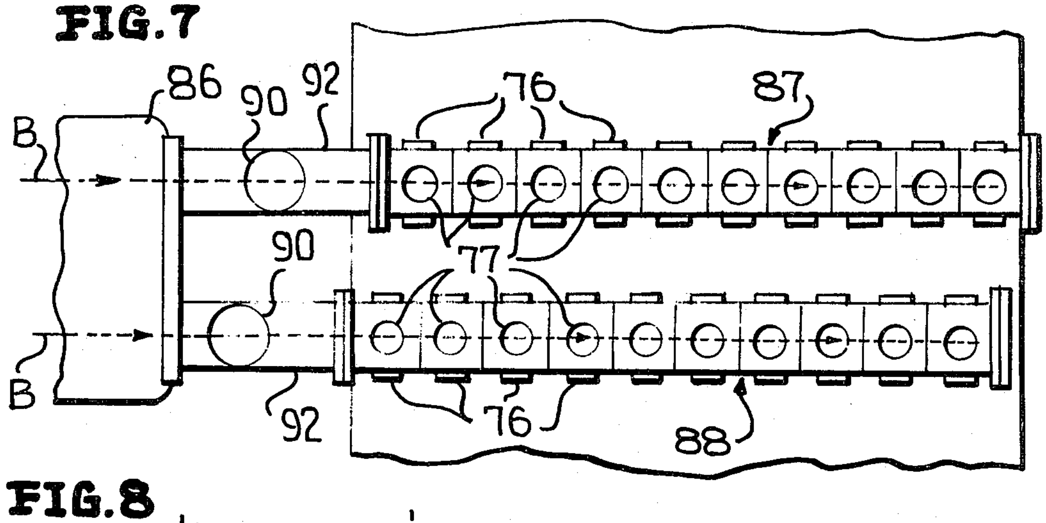
FIG. 7 is a diagrammatic top plan view of a modification of the beam scanning system of FIG. 4.

A modification of the beam scanning system 66 is illustrated in FIG. 7, the primary difference in the latter system being the use of a dual beam electron accelerator 86 in combination with two magnetic scanning assemblies 87 and 88 arranged in parallel relation on the same side of the conveyor path. Each path is constructed in the same manner as magnetic scanning assembly 67 with identical reference numbers used for the deflection magnets and beam windows. The magnetic scanning assemblies 87 and 88 each include vacuum pumps 90 for maintaining a vacuum in beam pipes 92 and are laterally offset relative to each other to produce more uniform irradiation across the conveyor path. Each of the magnetic scanning assemblies is controlled by a circuit which may be identical with that of FIG. 2 but with a delay line equal to half a positioned increment between a common oscillator 30 and a separate lead to each pair of AND gates 32 and 48.

Figure 8:
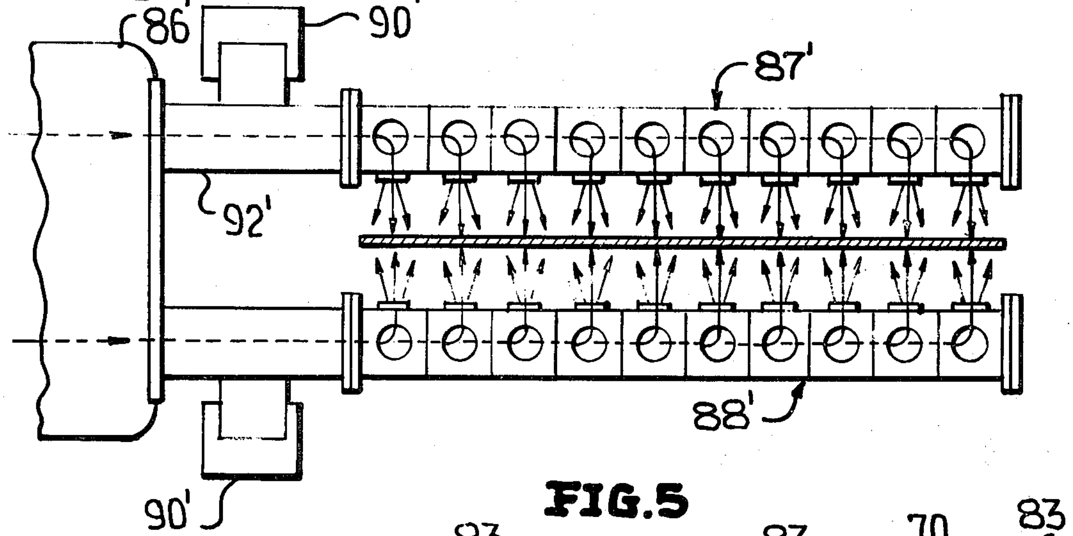
FIG. 8 is a diagrammatic elevation of another modification of the beam scanning system of FIG. 4.

In the modification of FIG. 8, a beam scanning system is shown having the same general arrangement as the system of FIG. 6 including a dual beam electron accelerator 86' and two magnetic scanning assemblies 87' and 88', parts of the system of FIG. 8 identical to parts of the system of FIG. 7 being given identical reference numbers with primes. Magnetic scanning assembly 88' is disposed below the conveyor path such that electron beams B irradiate the objects from opposite directions. In the modification of FIG. 8, the deflection magnets of magnetic scanning assemblies 87' and 88' are illustrated as being in alignment; however, the deflection magnets could be laterally offset, as in the modification of FIG. 7, if desired.

Figure 9:
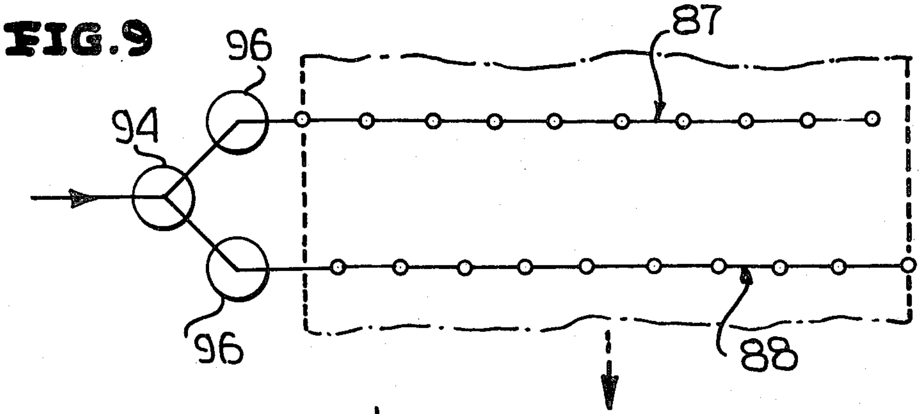
FIGS. 9 and 10 are schematic diagrams of variations of the modifications of FIGS. 7 and 8, respectively.
Figure 10:
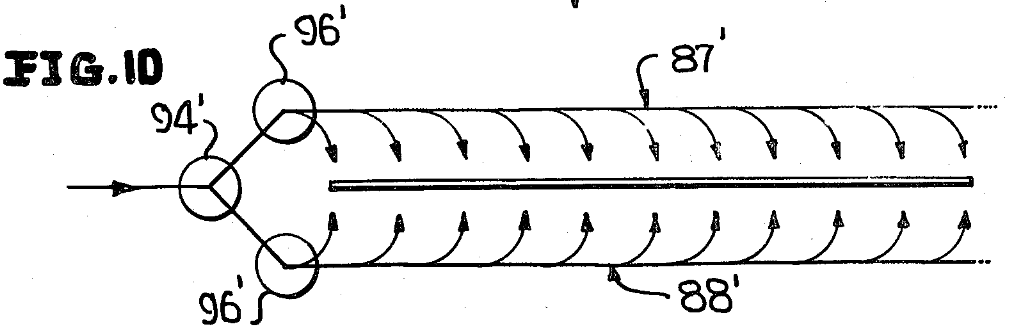

The embodiments of FIGS. 7 and 8 can be utilized with a single beam accelerator rather than a dual beam accelerator, if desired, by using switching magnets 94 and 94' and constant magnets 96 and 96' to deflect the electron beam B alternately from one magnetic scanning assembly to the other magnetic scanning assembly, as shown in FIGS. 9 and 10 respectively in which the magnetic scanning assembly structure is the same as that of FIGS. 7 and 8, respectively, and only schematically illustrated.

Figure 11:
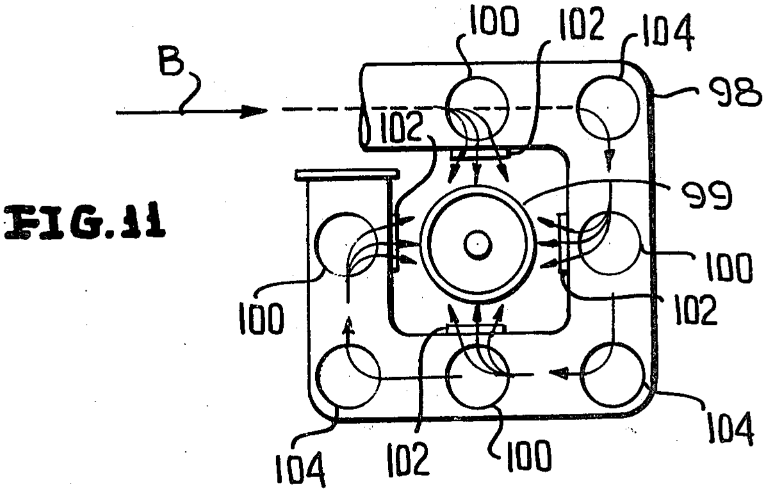
FIGS. 11 and 12 are schematic diagrams of further embodiments of beam scanning systems according to the present invention.

Sequentially energized deflection magnets operated in a manner similar to the operation of the beam scanning system 67 can be disposed in non-linear arrangements, as shown in FIG. 11, to irradiate the surfaces of round or irregularly-shaped objects such as jacketed cables, hoses, pipes, tubes, tires, bottles and the like. The beam scanning system of FIG. 11 includes a beam accelerator (not shown) supplying an electron beam B to a vacuum beam pipe 98 having a configuration to surround an object to be irradiated 99. The beam pipe has a plurality of controllable deflection magnets 100 disposed therealong, each positioned to deflect the electron beam B through one of a plurality of electron windows 102 disposed in the beam pipe. Interposed between the deflection magnets 100 are constant magnets 104 for continuously deflecting the electron beam between the deflection magnets 100. The controllable and constant magnets are disposed in accordance with the configuration of the object 99, to be irradiated such that the electron beam B can be directed around the object to be irradiated by the constant deflection magnets with a sufficient number of controllable deflection magnets 100 being arranged adjacent one another between the constant deflection magnets 104 to distribute the electron beam along any flat or irregular surfaces of an object to be irradiated. The controllable deflection magnets can be operated in any desired sequence to distribute the electron beam around the object to be irradiated since the constant deflection magnets 104 are positioned to direct the electron beam around the object to be irradiated with none of the controllable deflection magnets 100 energized. Energization of the deflection magnets is controlled by the circuit of FIG. 2 with each of he outputs 40 of decoder 38 controlling one of the deflection magnets 100 via a switching device in the manner described with respect to the system of FIG. 4 such that irradiation dosage is controlled by the period of time the deflection magnets 100 remain energized.

Figure 12:
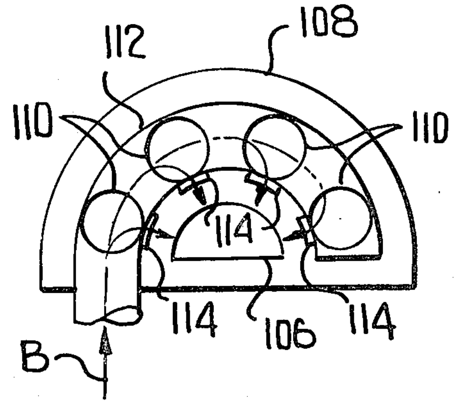

FIG. 12 illustrates another non-linear arrangement of controllable deflection magnets wherein electron beam B from a beam accelerator (not shown) is curved around an object to be irradiated 106 by means of a large area DC guide coil 108 within which are disposed a plurality of controllable deflection magnets 110 along a beam pipe 112 having beam windows 114 therein such that the deflection magnets can be sequentially energized by the circuit of FIG. 2 with the guide coil assuring that the electron beam is directed to the energized deflection magnet with the preceding deflection magnets unenergized.

It should be noted that a small jitter signal may be superposed on the deflection signals so as to produce small amplitude local sweeping of the beam. For instance, a signal with small positive and negative excursions such as a triangular wave symmetrical with respect to zero may be supperposed on lead 43 of FIG. 2 and produce local sweeping such as illustrated in FIG. 4. Such an approach permits use of a higher intensity beams in conjunction with greater spacing between windows 77.

While I have described and illustrated specific embodiments of the invention, it will be clear that variations of the details of construction which are specifically illustrated and described may be resorted to without departing from the true spirit and scope of the invention as described in the appended claims.

It should be noted that all/or part of the above-described circuit operations have been executed using discrete and/or combinations of discrete and integrated semi-conductor devices in the logic and power circuits. Most of the above discrete logic circuitry can be executed more simply by means of a programmable microprocessor system.

Further, it should be noted that the adjacent positions of the beam may be made to overlap so that for a given time of the beam at each of the locations, the dose applied to the common area is greater than both without a time increase.

What is claimed is:

1. A system for controlling the scanning of a beam of charged particles across a conveyor path to produce selective radiation dose at various locations comprising
particle accelerator means for producing a beam of charged particles;
deflecting means controllably operable to deflect said beam to a plurality of discrete positions across the conveyor path; and
control means coupled with said deflecting means to maintain said beam at each said discrete position for a preselected time in accordance with the radiation dose required at each said discrete position.

2. A system as recited in claim 1 wherein
said deflecting means includes a beam scanning device operable in response to a drive signal supplied thereto to sequentially and successively deflect said beam to said plurality of discrete positions, and
said control means includes circuit means for generating a discreetly time variable incremental drive signal supplied to said beam scanning device.

3. A system as recited in claim 2 further including means for superposing a position varying jitter signal on said drive signal.

4. A system as recited in claim 2 wherein said incremental drive signal has a step-like waveform with the width of each step controlling the time said beam is maintained at each of said positions and the amplitude of each step determining the discrete positions of said beam.

5. A system as recited in claim 4 wherein said circuit means includes oscillator means providing clock pulses, beam position determining means having a plurality of outputs and being responsive to said clock pulses to sequentially generate signals on said outputs, timing means coupled with said position determining means for maintaining the signal on each of said outputs for said preselected times.

6. A system as recited in claim 1 wherein said deflecting means includes a plurality of controllable deflection magnets sequentially operable in response to said control means to deflect said beam to said plurality of positions.

7. A system as recited in claim 6 wherein said deflecting means includes an evacuated beam pipe receiving said beam from said accelerator means and beam window means disposed in said beam pipe, said plurality of controllable deflection magnets being disposed along said beam pipe and being operable to deflect said beam through said beam window means.

8. A system as recited in claim 7 wherein said beam window means includes a plurality of beam windows each aligned with a different one of said controllable deflection magnets.

9. A system as recited in claim 7 wherein said beam window means includes an elongated beam window extending along said beam pipe in alignment with said plurality of controllable deflection magnets.

10. A system as recited in claim 9 wherein said beam pipe includes reinforcing ribs disposed between said plurality of controllable deflection magnets.

11. A system as recited in claim 7 wherein said beam pipe has a configuration to extend around an object to be irradiated.

12. A system as recited in claim 11 wherein said deflecting means includes a plurality of constant deflection magnets positioned along said beam pipe to direct said beam to said controllable deflection magnets.

13. A system as recited in claim 11 wherein said deflecting means includes a guide coil directing said beam to said plurality of controllable deflection magnets.

14. A system as recited in claim 8 wherein said control means includes oscillator means providing clock pulses, position circuit means having a plurality of outputs and being responsive to said clock pulses to sequentially generate beam deflection signals on said output timing means coupled with said position circuit means for maintaining the signal on each of said outputs for said preselected time, and a plurality of switching means each connected with a different one of said plurality of controllable deflection magnets and a different one of said outputs of said position circuit means for energizing said deflection magnets when the associated output of said position circuit means has a signal supplied thereto.

15. A system as recited in claim 1 wherein said deflecting means includes first and second magnetic scanning assemblies, each of said magnetic scanning assemblies including an evacuated beam pipe, beam window means disposed in said beam pipe and a plurality of controllable deflection magnets disposed along said beam pipe and sequentially operable in response to said control means to deflect said beam through said plurality of positions.

16. A system as recited in claim 15 wherein said first and second magnetic scanning assemblies are disposed in parallel relation on the same side of the conveyor path with the locations of said controllable deflection magnets laterally offset.

17. A system as recited in claim 16 wherein said accelerator means produces first and second beams of charged particles supplied to said beam pipes of said first and second magnetic scanning assemblies, respectively.

18. A system as recited in claim 16 wherein said accelerator means includes switching magnet means for alternately supplying said beam to said beam pipes of said first and second magnetic scanning assemblies.

19. A system as recited in claim 15 wherein said first magnetic scanning assembly is disposed on one side of the conveyor path and said second magnetic scanning assembly is disposed on the opposite side of the conveyor path.

20. A system as recited in claim 19 wherein said accelerator means produces first and second beams of charged particles supplied to said beam pipes of said first and second magnetic scanning assemblies, respectively.

21. A system as recited in claim 19 wherein said accelerator means includes switching magnet means for alternately supplying said beam to said beam pipes of said first and second magnetic scanning assemblies.

22. A system as recited in claim 1 wherein said control means includes oscillator means providing cock pulses, position circuit means having a plurality of outputs and being responsive to said clock pulses to sequentially generate beam deflection signals on said outputs, timing means coupled with said position circuit means for maintaining the signal on each of said outputs for said preselected time, and means responsive to said signals on said outputs to control said deflecting means.

23. A system as recited in claim 22 wherein said position circuit means includes a position counter receiving and counting said clock pulses and a decoder responsive to the count in said position counter to generate signals on said outputs, said timing means includes a timing counter for receiving and counting said clock pulses and a programmable decoder responsive to said timing counter reaching a predetermined count to produce an output signal, and said control means includes gate means for controlling the supply of said clock pulses to said position counter, said gate means being responsive to a signal on said outputs of said decoder to prevent further clock pulses from being supplied to said position counter and being responsive to said output signal from said programmable decoder to again permit said clock pulses to be supplied to said position counter.

24. A method of scanning a beam of charged particles across the path of movement of a body to control irradiation dosage at a plurality of selected positions along the line of scan comprising the steps of deflecting the beam sequentially and successively from preselectable position to preselectable position along the line of scan; and controlling the length of time the beam remains at each such position to control the irradiation dosage at each position.

25. A method as recited in claim 24 wherein said deflecting step includes using a beam scanning device to deflect the beam and said controlling step includes supplying a drive signal having a step-like waveform to the beam scanning device with the width of each step controlling the length of time the beam remains at each position and the height of each step controlling the position of the beam.

26. A method as recited in claim 25 wherein said deflecting step includes supplying control pulses to controllable deflection magnets to sequentially operate the controllable deflection magnets with the width of each pulse controlling the length of time the beam remains at each position.

27. The method of applying a two dimensional pattern of independently variable irradiation dosage to a moving object or material comprising the steps of moving that which is to be irradiated along a predetermined path, forming a beam of charged particles to produce a desired irradiation dose rate, sequentially and selectively moving the beam along a path generally transverse to the movement of that which is to be irradiated to provide successive parallel scans thereacross, causing the beam to dwell at preselected positions along the path of movement of the beam for periods of time required to accumulate at each selected position the desired dose at the dose rate provided by the beam.

28. A method as recited in claim 27 wherein the preselected positions are selected to be different for two adjacent paths.

29. A system for controlling the scanning of a beam of charged particles across a path to produce selective radiation doses at various locations along the path comprising means for producing a beam of charged particles;

deflecting means operable to deflect said beam to a plurality of positions across the conveyor path; and control means coupled with said deflecting means to maintain said beam at each position for a variable preselected time in accordance with the radiation dose required at each said position.

* * * * *

UNITED STATES PATENT AND TRADEMARK OFFICE

CERTIFICATE OF CORRECTION

PATENT NO. : 4,295,048

DATED : October 13, 1981

INVENTOR(S) : Marshall R. Cleland and Howard F. Malone, Sr.

It is certified that error appears in the above—identified patent and that said Letters Patent is hereby corrected as shown below:

On the cover sheet Insert

--(73) Assignee: Radiation Dynamics, Inc., Melville, L.I., New York --.

Signed and Sealed this

***Nineteenth* Day of *January 1982***

[SEAL]

*Attest:*

GERALD J. MOSSINGHOFF

*Attesting Officer* *Commissioner of Patents and Trademarks*